United States Patent
Höglinger et al.

[11] Patent Number: 5,918,663
[45] Date of Patent: Jul. 6, 1999

[54] COOLING DEVICE FOR A MOTOR VEHICLE

[75] Inventors: Markus Höglinger, Stuttart; Robert Kuhn, Gerlingen, both of Germany

[73] Assignee: Behr GmbH & Co., Stuttgart, Germany

[21] Appl. No.: 08/686,768

[22] Filed: Jul. 26, 1996

[30] Foreign Application Priority Data

Jul. 27, 1995 [DE] Germany .......................... 195 27 442

[51] Int. Cl.⁶ ............................ F28F 1/00; B60H 3/00; B60K 11/00; B60R 19/52
[52] U.S. Cl. ............................ 165/41; 165/41; 165/42; 165/43; 180/68.1; 180/68.2; 293/117
[58] Field of Search ................. 180/68.4, 68.1, 180/68.2; 165/51, 41; 123/41.48, 195 C, 198 E; 296/208; 293/117

[56] References Cited

U.S. PATENT DOCUMENTS

| | | | |
|---|---|---|---|
| 4,191,244 | 3/1980 | Keske | 165/69 |
| 4,566,407 | 1/1986 | Peter | 123/41.48 |
| 4,653,788 | 3/1987 | Di Giusto | 293/117 |
| 4,805,747 | 2/1989 | Moedinger et al. | 180/68.1 |
| 5,476,138 | 12/1995 | Iwasaki et al. | 165/41 |
| 5,671,802 | 9/1997 | Rogers | 165/41 |

FOREIGN PATENT DOCUMENTS

| | | |
|---|---|---|
| 0451916A2 | 10/1991 | European Pat. Off. . |
| 3108845A1 | 9/1982 | Germany . |
| 3338466A1 | 5/1985 | Germany . |
| 3503600A1 | 8/1986 | Germany . |
| 4132570A1 | 4/1993 | Germany . |
| 1144429 | 3/1969 | United Kingdom . |
| 2072327 | 9/1981 | United Kingdom . |
| 2150987 | 7/1995 | United Kingdom . |

OTHER PUBLICATIONS

German Search Report Apr. 3, 1996.
Patent Abstracts of Japan, M–1500, Oct. 21, 1993, vol. 17/No. 580, JP5–170039.
Maxwell, James. Glasfaserverstärkte Thermoplate für die Automobil–Industrie. Atz Automobiltechnische Zeitschrift 81, 1979, 10, S. 491, 492, 495–497.
ATZ Automobiltechnische Zeitschrift 89, 1987, 5, S, 225, 226.
Great Britain Search Report Oct. 14, 1996.

*Primary Examiner*—Ira S. Lazarus
*Assistant Examiner*—Matthew G. Pryor
*Attorney, Agent, or Firm*—Evenson, McKeown, Edwards & Lenahan, PLLC

[57] ABSTRACT

A cooling device is disclosed with an air guiding device for guiding of air to cooling devices connected with inlet openings in lower and lateral areas of a motor vehicle front. The air guiding device is constructed as a flow duct which adjoins the cooling device by means of a fan hood and which extends to the inlet opening and is provided there with an elastic wall whose ends are constructed as a surrounding sealing profile and are placed directly against the contour of the inlet opening under an elastic prestressing.

16 Claims, 4 Drawing Sheets

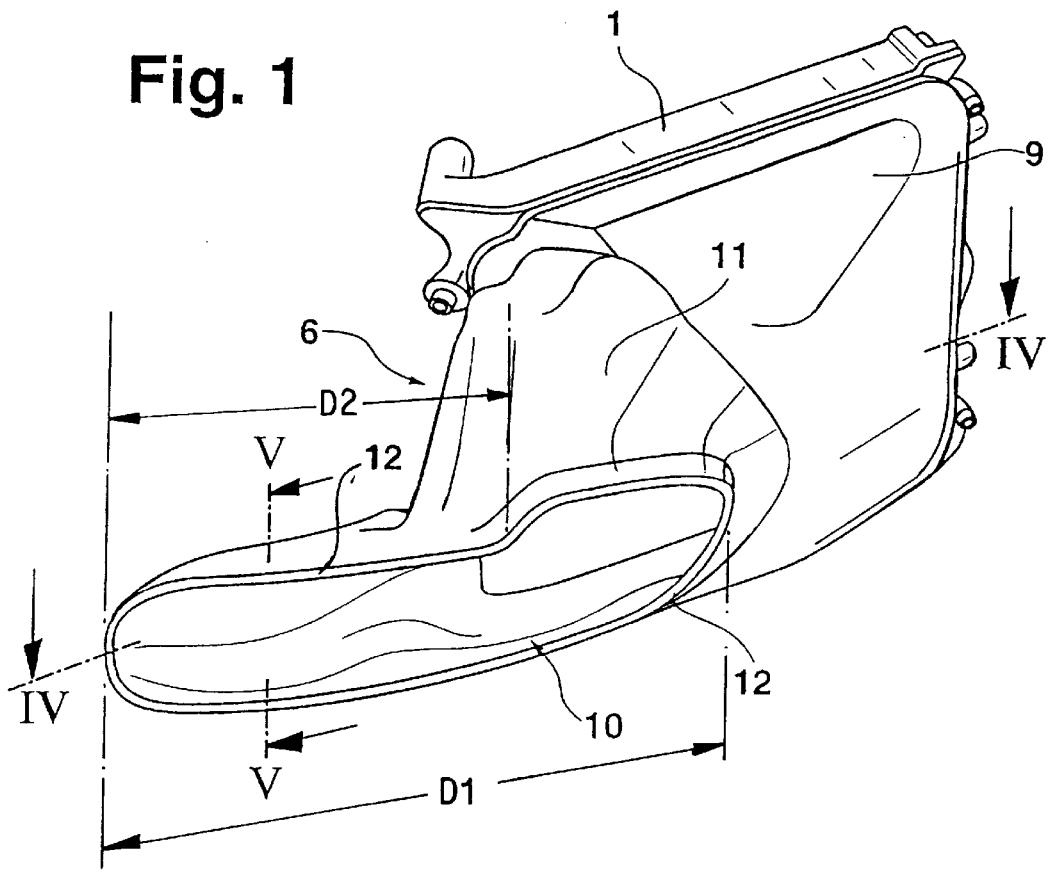
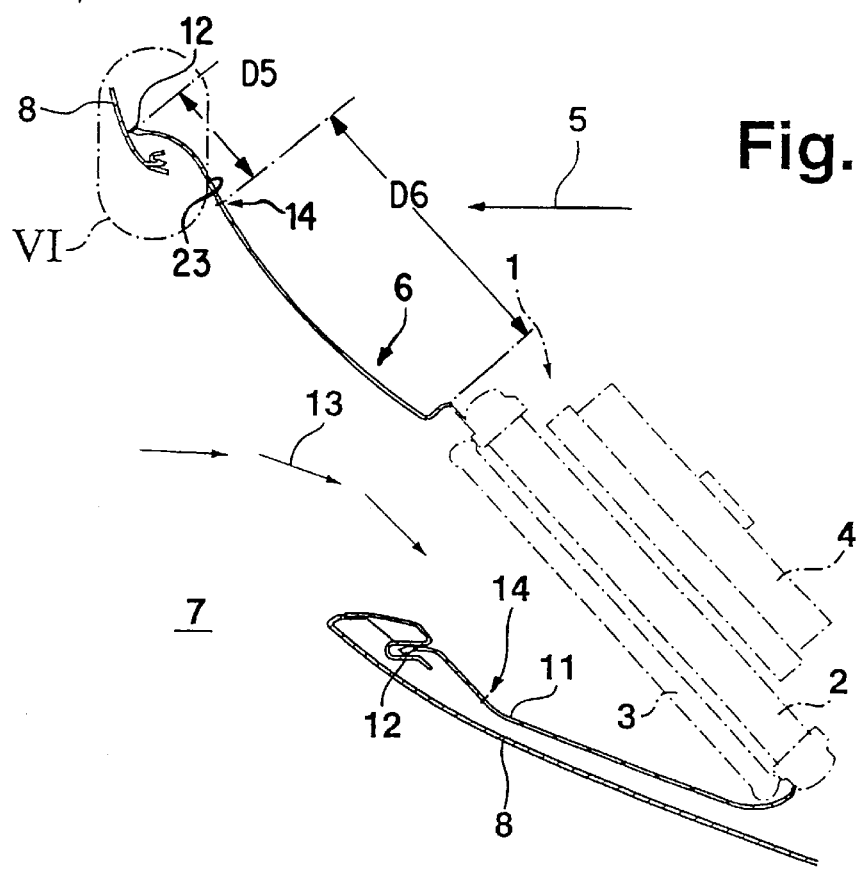

COOLING DEVICE FOR A MOTOR VEHICLE

BACKGROUND AND SUMMARY OF THE INVENTION

This invention relates to a cooling device which is arranged in the front area of a motor vehicle body and is connected by way of an air guiding device with an inlet opening in the vehicle body front part, particularly in a bumper constructed as the front part.

There are vehicles which, for reasons of appearance, have a pulled-down front opening hood or engine hood so that the air inlet slots required for the engine cooling or also for the vehicle ventilation must be placed in the area of the bumper which is constructed as a front part. Guiding the air from this inlet opening to the cooling devices arranged in the vehicle body, as, for example, a coolant radiator or a so-called cooling module, which, in addition, may also contain an air-conditioning condenser connected in front or behind and/or a charge air cooler, as a rule, is difficult to achieve in such a manner that an optimal flow-through effect of the cooling device is achieved. This applies particularly when, for constructive reasons, the cooling devices are arranged laterally in the front area and not, as customary, in the center of the front area.

It is an object of the invention to provide for solutions for cooling devices of the initially mentioned type which permit a perfect guiding of air to the cooling units without a complicated construction and mounting.

For achieving this object, it is provided according to the invention in the case of a cooling device of the initially mentioned type that the air guiding device is constructed as a flow duct which adjoins a cooling device by means of a hood and which extends to the inlet opening and is provided there with an elastic wall whose ends are constructed as a surrounding sealing profile and while being elastically pre-stressed are placed directly on the contour of the inlet opening.

On the one hand, by means of preferred embodiments of the invention, the entering air is forced to flow through the assigned cooling device, in which case the provided flow duct may be designed according to fluidic aspects. This flow duct, which causes the entering air to flow completely and without losses through the cooling units, by means of the invention, can also very easily be connected to the inlet opening, for example, in a bumper, in a sufficiently tight manner. The separate arrangement of so-called sealing weatherstrips, which requires a high-expenditure mounting, becomes superfluous.

In a further development of preferred embodiments of the invention, the sealing profile may be provided with three sealing edges which point in different directions and which are each assigned to different areas of the inlet opening and provide the required sealing there. These embodiments have the advantage that the elastic wall of the flow duct can be placed in a sealing contact while in each case being adapted to the local conditions, so that one does not have to rely, for example, on only an interior sealing lip which would be very difficult to apply in a sealing manner and can be applied only by means of auxiliary devices.

In a further development of the invention, the sealing edges form three of the corners of a profile which is basically constructed as a trapezoid and whose side situated opposite the surface area changes into the exterior wall of the flow duct.

Advantageously, the flow duct may be constructed as a two-component part whose hood pointing to the cooling device is dimensionally stable and whose elastic wall is mounted in one piece on the dimensionally stable hood. This embodiment permits a one-piece arrangement which is easy to mount.

In a further development of the invention, the inlet opening may have an upper area reaching slightly beyond the opening center, a deflection area adjoining it which points to the vehicle center and an area which connects these two areas. In preferred embodiments of the invention, the outward-pointing sealing edge is placed in a contacting manner in the last mentioned area and the inward-pointing sealing edge is placed in a contacting manner in the first mentioned area and the sealing edge of the sealing profile which reaches the farthest to the outside is placed in a contacting manner in the deflection area. By means of this embodiment, on the one hand, the elastic features of the sealing profile can be utilized; on the other hand, however, the areas in which a certain vacuum occurs as a result of the flow can be utilized for pressing the sealing profile against the assigned wall parts of the inlet opening. Thus, in a further development of this idea, the inlet opening in the area which connects the deflection area and the area reaching beyond the opening center with one another may be framed by a groove which is open toward the flow duct and into which the sealing profile is placed. This groove preferably may be formed by a holding frame which is clipped onto the bumper having the inlet opening.

Other objects, advantages and novel features of the present invention will become apparent from the following detailed description of the invention when considered in conjunction with the accompanying drawings.

BRIEF DESCRIPTION OF THE DRAWINGS

FIG. 1 is a perspective view of a coolant radiator provided with a front-connected flow duct constructed according to a preferred embodiment of the invention;

FIG. 4 is a representation of the sectional view along plane IV—IV in FIG. 1;

DETAILED DESCRIPTION OF THE DRAWINGS

Figure 1A:
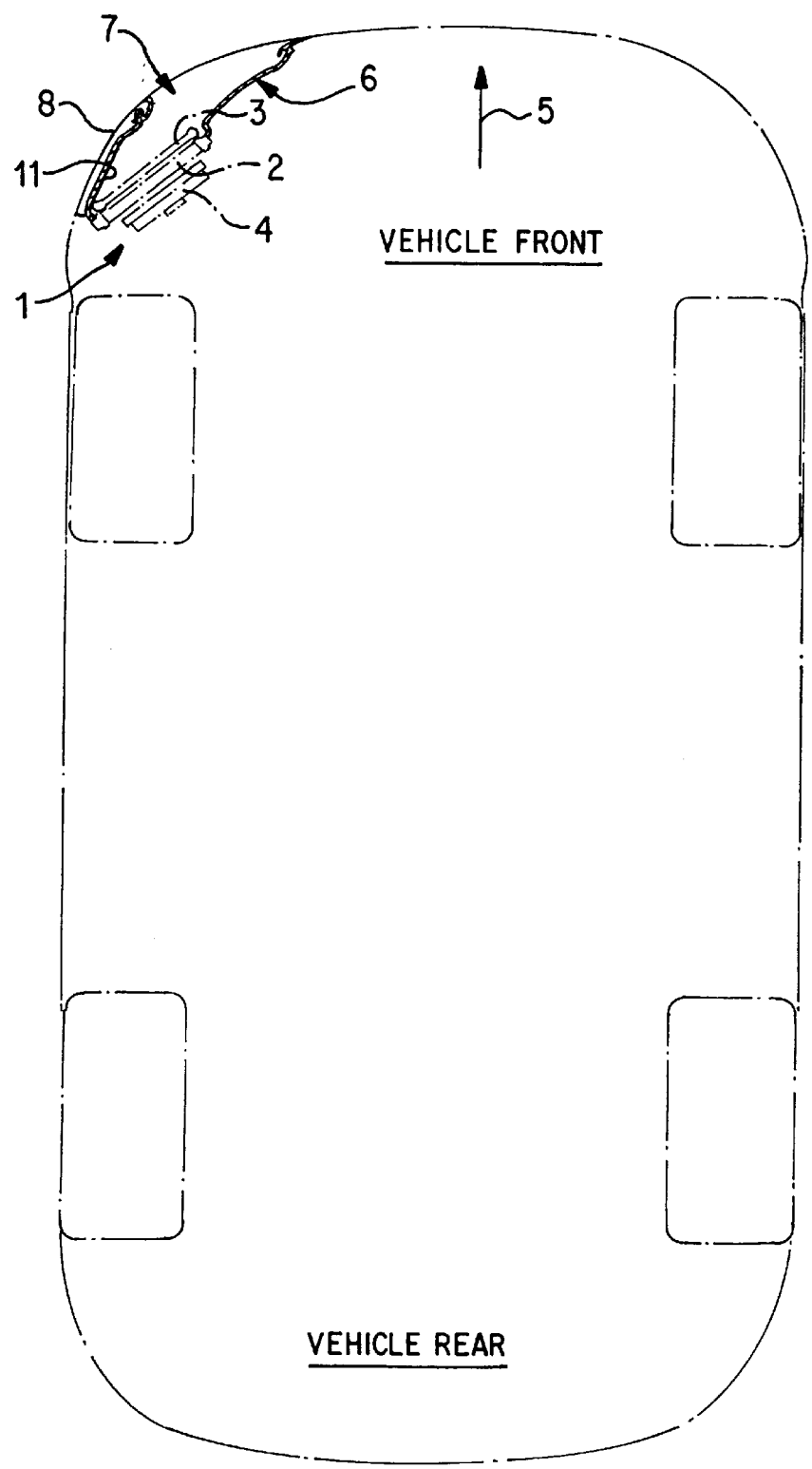
FIG. 1A is a schematic top view of a motor vehicle, depicting the location of a cooling system constructed according to preferred embodiments of the present invention.
Figure 2:
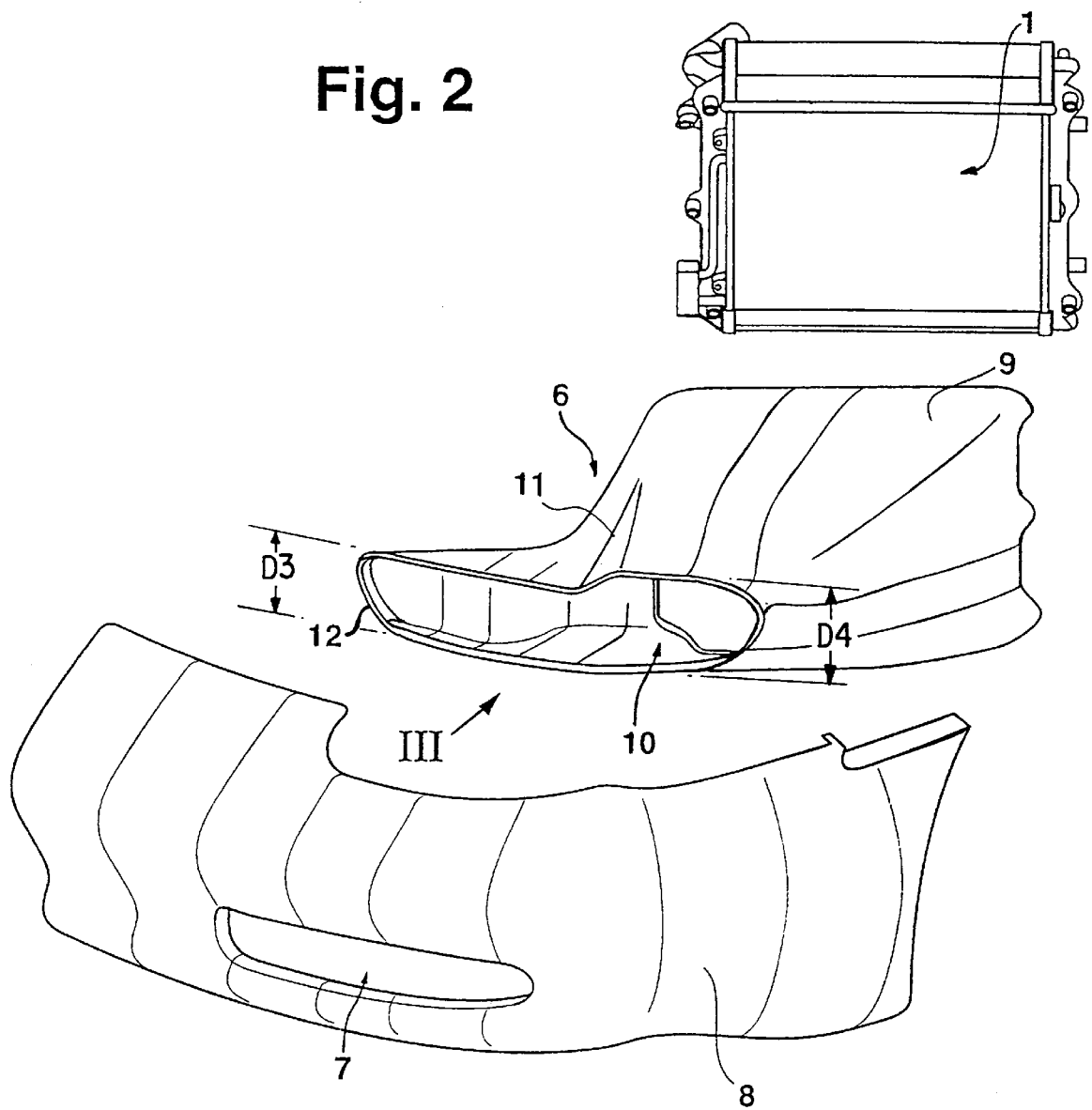
FIG. 2 is a schematic, perspective exploded view of the coolant radiator and flow duct of FIG. 1 and of the inlet opening assigned to the flow duct and arranged in a vehicle bumper.

FIGS. 1 and 2 show a cooling module 1 for the installation in the front area of a motor vehicle which consists of a coolant radiator 2 and (see FIG. 4) additional cooling devices 3 and 4 which are connected in front and behind. In the installed position, this cooling module is arranged diagonally to the driving direction 5 schematically indicated in FIG. 4 and, by way of a flow duct 6, is connected with the inlet opening 7 of a bumper 8 constructed as a front part for the vehicle which is not shown schematically in FIG. 1A.

Figure 5:
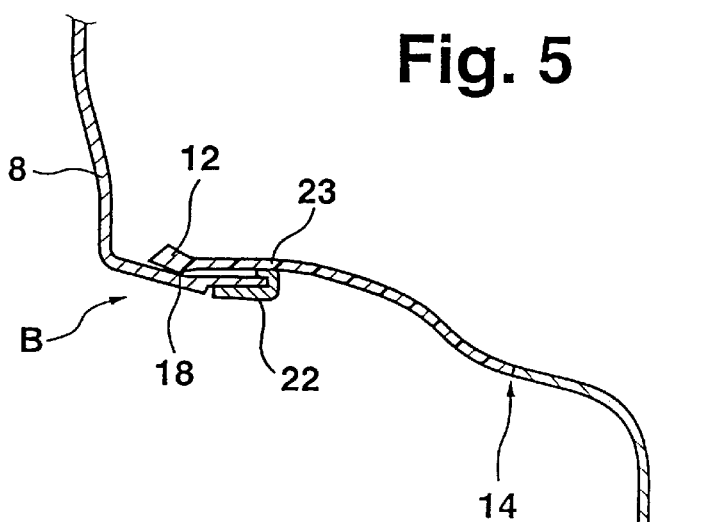
FIG. 5 is a sectional view of the flow duct along the plane V—V in FIG. 1.
Figure 6:
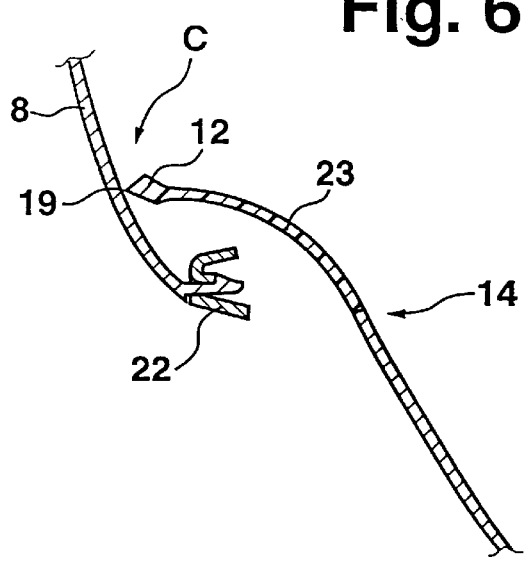
FIG. 6 is an enlarged representation of the detail VI in FIG. 4.

The flow duct 6 consists of a type of hood 9 which directly adjoins the cooling module 1 and is fastened there, as well as of an air guiding wall 11 which leads to an oblong connection opening 10 and changes at the connection opening 10 into a surrounding sealing profile 12. By means of this sealing profile 12, the wall 11 of the flow duct 6, as also illustrated in FIGS. 4 to 6, rests tightly against the parts of the bumper or against parts assigned to it.

FIG. 4 illustrates that air entering during the vehicle operation through the inlet opening 7 of the bumper 8 is deflected in the direction of the arrows 13 within the flow duct 6 and is forced to flow through the cooling module 1.

The flow duct 6 is constructed as a so-called two-component part. As illustrated particularly in FIGS. 4 to 6, flow duct 6 consists of a dimensionally stable, relatively hard part which may be made of a thermoplastic material, for example, of polypropylene, and which also forms the hood 9 establishing the cooler connection, as well as of a further area which is injection-molded in one piece to this dimensionally stable part and which exists in the area of the vehicle-side connection opening 10 and reaches approximately to the separating points in each case marked with the reference number 14. This soft area may consist of an elastomer or of a mixture of an elastomer and a thermoplastic material. This "soft area" also forms the surrounding sealing profile 12 which is placed against the inlet opening in the manner described in the following.

Since techniques for connecting such "soft" and "hard" plastic parts together are generally known to those skilled in the art as evidenced by United Kingdom Patent 2,072,327, further details of this connection are dispensed with herein.

Figure 3:
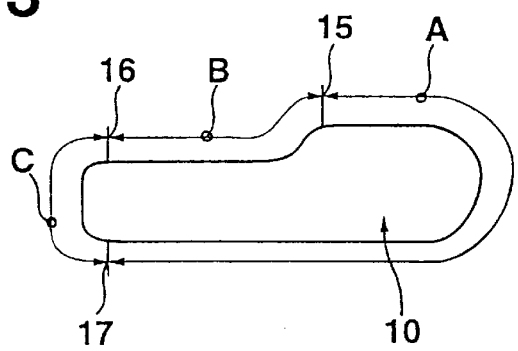
FIG. 3 is a schematic representation of the top view of the connection point of the flow duct to the inlet opening viewed in the direction of the arrow III.

As first illustrated in FIG. 3, the end of the flow duct 6 which forms the connection opening 10 and is therefore assigned to the "soft area" has an oblong construction. Like the inlet opening 7 on the bumper 8, this connection opening 10 also extends in the exterior front area of the vehicle diagonally to the driving direction 5. In this case, the connection opening 10 is divided into three areas (A, B and C). The first area (B), which extends between the positions 15 and 16, extends approximately horizontally on the top side of the connection opening 10 and through a deflection area (C), which extends between the positions 16 and 17, forms the left edge of the connection opening 10. The area (A) extends between positions 15 and 17 and comprises two horizontal areas which extend approximately in parallel with respect to one another as well as the deflection area forming the right edge of the connection opening 10.

Figure 7:
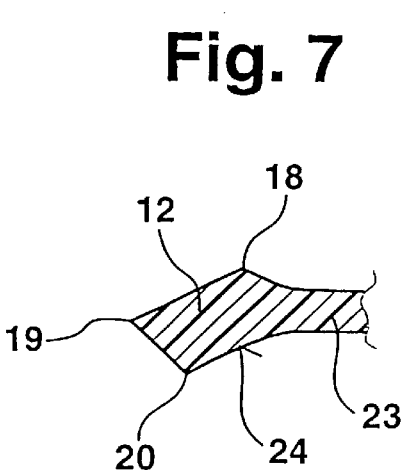
FIG. 7 is an enlarged representation of the sealing profile at the end of the flow duct.

In area (A), the sealing profile 12, which, according to FIG. 7, has three sealing edges 18, 19, 20 pointing into different directions, rests with its sealing edge 20 against the exterior side of a groove 21 which, in the illustrated embodiment (see FIG. 5), is formed by a holding frame 22 which, in a manner not shown in detail, is clipped to the interior edge of the inlet opening 7 of the bumper 8. In this case, the elastic sealing profile 12 is pressed to the outside in the area (A) because of the elasticity inherent to it and to the adjoining wall section 23 so that the sealing edge 20 comes to rest in a contacting manner on the inside of the groove 21.

In the area (B), that is, at the points which, starting from position 15, adjoin the area (A), the sealing profile 12 rests directly by means of its edge 18 against a portion of the bumper, that is, against a portion which forms the inlet opening 7.

In the area (C) (FIG. 6) the sealing profile 12 rests, by means of the sealing edge 19 projecting the farthest toward the outside, also directly against a wall of the bumper 8. The elastic portion of the flow duct 6 with the sealing profile 12 in this case surrounds the holding frame 22 in this area. Since, as a result of the flow, a certain vacuum occurs in this area, the sealing profile on the elastic wall part adjoining it is pressed by means of its sealing edge 19 against the bumper 8 and rests against it in a contacting manner by means of a constructive prestress.

FIG. 7 also shows that the sealing profile 12 in principle has a trapezoid basic construction, the sealing edges 18 and 19, in each case, being situated against the ends of the surface area, and the sealing edge 20 being situated on the transition of the lateral surface into the trapezoidal side extending opposite the surface area and in parallel to it. This latter trapezoidal side 24 will then merge with a relatively slight deflection into the elastic wall 23 of the flow duct 6.

Figure 8:
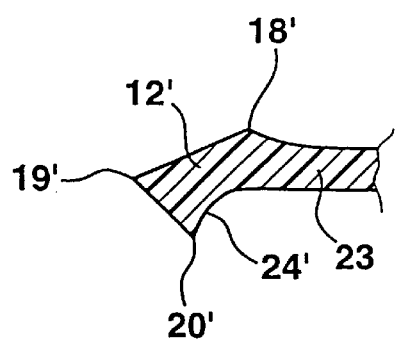
FIG. 8 is a view of a variant of the sealing profile of FIG. 7.

FIG. 8 illustrates a modification of the sealing profile 12', in the case of which, however, sealing edges 18', 19' and 20' are also provided again. The difference is only that the sealing edge 20' is constructed to be slightly more pointed because the adjoining wall 24' does not extend in parallel to the surface area of the trapezoid but merges in a curved manner into the wall 23. However, also by means of a sealing profile 12' constructed according to FIG. 8, in the same above-described manner, a tight connection of the flow duct 6 on the bumper is achieved.

As also clearly shown in the drawing figures, it is sufficient during the mounting to slide the bumper from the outside onto the already mounted cooling device with the flow duct 6. The sealing edges of the profile 12 will then largely automatically place themselves against the areas A to C explained in FIGS. 4 to 6 without the requirement of a subsequent sealing by means of the installation of a sealing weatherstrip or the like. As a result, the mounting is extremely simple. The air entering at the bumper 8 is supplied completely and without any losses through the closed flow duct 6 to the cooling module 1.

In a practical, preferred embodiment of the invention, the following dimensions shown schematically in the drawings are used:

D1 = 440 mm
D2 = 290 mm
D3 = 150 mm
D4 = 170 mm
D5 =  60 mm
D6 = 180 mm

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Cooling device which is arranged in a front area of a motor vehicle body and is connected by way of an air guiding device with an inlet opening in a vehicle body front part, specifically in a bumper constructed as the front part, comprising:

a hood joining the air guiding device to the cooling device, said air guiding device being constructed as a flow duct extending to the inlet opening and provided with an elastic wall, and are constructed as a surrounding sealing profile constructed from ends of said elastic wall and forming a connection opening, said sealing profile being elastically prestressed directly against a contour of the inlet opening.

2. Cooling device according to claim 1, wherein the sealing profile is provided with three sealing edges which point in different directions and which are assigned to different areas of the connection opening which adjoins the inlet opening.

3. Cooling device which is arranged in a front area of a motor vehicle body and is connected by way of an air guiding device with an inlet opening in a vehicle body front part, Particularly in a bumper constructed as the front part, wherein the air guiding device is constructed as a flow duct which adjoins the cooling device by way of a hood and which extends to the inlet opening and is provided there with an elastic wall with ends which are constructed as a surrounding sealing profile forming a connection opening, said sealing profile being placed under an elastic prestressing directly against a contour of the inlet opening, wherein the sealing profile is provided with three sealing edges which point in different directions and which are assigned to different areas of the connection opening which adjoins the inlet opening, and wherein the sealing edges form three corners of a profile which is basically constructed as a trapezoid and which has a side situated opposite one of the three corners which merges into the elastic wall of the flow duct.

4. Cooling device which is arranged in a front area of a motor vehicle body and is connected by way of an air guiding device with an inlet opening in a vehicle body front part, particularly in a bumper constructed as the front part, wherein the air guiding device is constructed as a flow duct which adjoins the cooling device by way of a hood and which extends to the inlet opening and is provided there with an elastic wall with ends which are constructed as a surrounding sealing profile forming a connection opening, said sealing profile being placed under an elastic prestressing directly against a contour of the inlet opening, and wherein the flow duct is constructed as a two-component part including a dimensionally stable hood pointing toward the cooling device and said elastic wall is mounted in one piece on the dimensionally stable hood.

5. Cooling device according to claim 2, wherein the different areas of the connection opening adjoining the inlet opening include an upper area extending slightly beyond a center of the opening, a deflection area which adjoins the upper area and extends toward a center of the vehicle, and a connecting area which connects these upper and deflection areas, wherein an outwardly directed one of the sealing edges rests against the connecting area, wherein an inwardly directed one of the sealing edges rests against the upper area, and wherein one of the sealing edges of the sealing profile which extends farthest outside rests against the deflection area.

6. Cooling device according to claim 5, wherein the inlet opening is framed in the connecting area by a groove which is open toward the flow duct and, wherein the sealing profile is placed in this groove.

7. Cooling device according to claim 6, wherein the groove is formed by a holding frame which is clipped to the bumper having the inlet opening.

8. Cooling device according to claim 3, wherein the different areas of the connection opening adjoining the inlet opening include an upper area extending slightly beyond a center of the opening, a deflection area which adjoins the upper area and extends toward a center of the vehicle, and a connecting area which connects these upper and deflection areas, wherein an outwardly directed one of the sealing edges rests against the connecting area, wherein an inwardly directed one of the sealing edges rests against the upper area, and wherein one of the sealing edges of the sealing profile which extends farthest outside rests against the deflection area.

9. Cooling device according to claim 5, wherein the flow duct is constructed as a two-component part including a dimensionally stable hood pointing toward the cooling device and said elastic wall is mounted in one piece on the dimensionally stable hood.

10. Cooling device according to claim 8, wherein the flow duct is constructed as a two-component part including a dimensionally stable hood pointing toward the cooling device and said elastic wall is mounted in one piece on the dimensionally stable hood.

11. Air supply guide arrangement interposed in use between a vehicle front body member with an air inlet opening and a vehicle cooling device, said air supply guide arrangement comprising:

a hood adjoining the vehicle cooling device, an elastic flow duct extending from the hood to a position around the air inlet opening defined by the front body member, and a sealing profile provided on an end of said elastic flow duct and elastically prestressed against the front body member.

12. An air supply guide arrangement according to claim 11, wherein the elastic flow duct has an end facing the front body member which is provided with the sealing profile which defines a connection opening which in use surrounds the air inlet opening in the front body member.

13. Air supply guide arrangement interposed in use between a vehicle front body member with an air inlet opening and a vehicle cooling device, said air supply guide arrangement comprising:

a hood adjoining the vehicle cooling device, and an elastic flow duct extending from the hood to a position elastically prestressed against the vehicle front body member around the air inlet opening, wherein theelastic flow duct has an end facing the front body member which is provided with a sealing profile defining a connection opening which in use surrounds the air inlet opening in the front body member, and wherein said sealing profile has a constant cross section exhibiting a plurality of sealing edges, which in use sealingly engage respective different areas of the front body member around the connection opening.

14. Air supply guide arrangement according to claim 13, wherein the sealing edges form three corners of a profile which is basically constructed as a trapezoid and which has a side situated opposite one of the three corners which merges into the elastic wall of the flow duct.

15. Air supply guide arrangement according to claim 11, wherein said front body member is a vehicle bumper.

16. Air supply guide arrangement according to claim 11, wherein said hood is formed of a relatively rigid dimensionally stable plastic, and wherein said elastic flow duct is connected in one piece with said hood.

* * * * *